United States Patent
Shifris et al.

(10) Patent No.: US 8,340,093 B2
(45) Date of Patent: Dec. 25, 2012

(54) SYSTEM AND METHOD FOR MONITORING PHYSICAL LAYER CONNECTIVITY

(75) Inventors: Pinchas Shifris, Tel Aviv (IL); Alex Shar, Rishon Letzion (IL); Yaakov Haggay, Kfar Saba (IL); Ilan Kelmer, Rehovot (IL); Yishay Gourman, Modiin (IL); Uriya Mantver, Tel-Aviv (IL); Guy Shapira, Ramat Hasharon (IL)

(73) Assignee: RIT Technologies Ltd., Tel Aviv (IL)

( * ) Notice: Subject to any disclaimer, the term of this patent is extended or adjusted under 35 U.S.C. 154(b) by 112 days.

(21) Appl. No.: 13/002,038

(22) PCT Filed: Jul. 2, 2009

(86) PCT No.: PCT/IL2009/000661
§ 371 (c)(1),
(2), (4) Date: Mar. 1, 2011

(87) PCT Pub. No.: WO2010/001400
PCT Pub. Date: Jan. 7, 2010

(65) Prior Publication Data
US 2011/0141943 A1 Jun. 16, 2011

Related U.S. Application Data

(60) Provisional application No. 61/077,497, filed on Jul. 2, 2008.

(51) Int. Cl.
*H04L 12/28* (2006.01)
(52) U.S. Cl. ............... 370/389; 370/401; 439/49
(58) Field of Classification Search .......... None
See application file for complete search history.

(56) References Cited

U.S. PATENT DOCUMENTS

| | | | |
|---|---|---|---|
| 6,222,908 B1 | 4/2001 | Bartolutti | |
| 8,089,976 B2 * | 1/2012 | Caveney et al. | 370/401 |
| 2006/0160395 A1 | 7/2006 | Macauley | |
| 2006/0282529 A1 * | 12/2006 | Nordin | 709/224 |
| 2008/0049627 A1 * | 2/2008 | Nordin | 370/241 |
| 2008/0122579 A1 | 5/2008 | German | |
| 2009/0263980 A1 * | 10/2009 | Nordin et al. | 439/49 |

FOREIGN PATENT DOCUMENTS
EP 1 778 825 5/2007

OTHER PUBLICATIONS

International Search Report for International Application No. PCT/IL2009/000661. Date of mailing Dec. 4, 2009.

* cited by examiner

*Primary Examiner* — Duc C Ho
(74) *Attorney, Agent, or Firm* — Pearl Cohen Zedek Latzer, LLP (57) ABSTRACT

Embodiments of the present inventions are directed to a system and method for monitoring connectivity between a switch having switch ports and a patch panel having patch panel ports connected by removable cords. The system may include an identification device physically shaped to fit a cavity of the switch port, a communication cord having identification wires to connect the switch port to a patch panel port, a microcontroller mounted on the patch panel to read a unique identification number of the identification device in order to identify a connection between the switch port and the patch panel port and a management station to receive the unique identification from the microcontroller and to store data regarding the connection of the switch port and the patch panel port.

18 Claims, 12 Drawing Sheets

FIG_1

FIG_2

FIG_3a        FIG_3b

FIG_3c

FIG_4a          FIG_4b

FIG_5a  FIG_5b

FIG_6a

FIG_6b

FIG-7

FIG_9

FIG_10

FIG_11a

FIG_11b

FIG_12

SYSTEM AND METHOD FOR MONITORING PHYSICAL LAYER CONNECTIVITY

CROSS-REFERENCE TO RELATED APPLICATIONS

This application is a National phase application of PCT International application No. PCT/IL2009/000661, International filing date Jul. 2, 2009, claiming priority of U.S. Provisional Patent Application 61/077,497, filed Jul. 2, 2008, both of which are incorporated herein in their entirety.

BACKGROUND

The need for automatic management of the connectivity of the physical layer of a communication network including monitoring and mapping the connection patterns between data port in communication rooms is well known in the IT industry. Monitoring and mapping the physical connectivity of the network may require real-time identification of changes in interconnections between communication ports. For example, the physical layer may be arranged in an interconnect topology in which ports of the switch may be dynamically connected to ports of a patch panel by multiconductor cables, also known as patch cords. Some existing solutions require the installation of add-on hardware over the front panel of the switch. In many cases, the high density of ports on the front panel may not enable usage on such add-on hardware or else an add-on device may cause mechanical interference so that replacement of patch cord would be difficult or impossible.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present invention are directed to a device with a unique identification inserted into a switch port connected to a patch panel. The device may be designed to be is physically shaped to fit a cavity of the switch port and may be inserted into the socket and removed, if desired. The unique identification of the device may be remotely read by a microcontroller mounted on a patch panel coupled to the switch to identify a connection between the switch port and corresponding port on the patch panel. Embodiments of the present invention are directed to a system for monitoring connectivity between a switch having switch ports and a patch panel having patch panel ports connected by removable cords wherein the system comprises the identification device located within a switch port, a communication cord to connect the switch port to a patch panel port, wherein the communication cord having identification wires; a microcontroller mounted on the patch panel to read a unique identification number of the identification device, wherein the identification number is transmitted via the identification wires in order to identify a connection between the switch port and the patch panel port; and a management station to receive the unique identification from the microcontroller and to store data regarding the connection of the switch port and the patch panel port.

Figure 1:
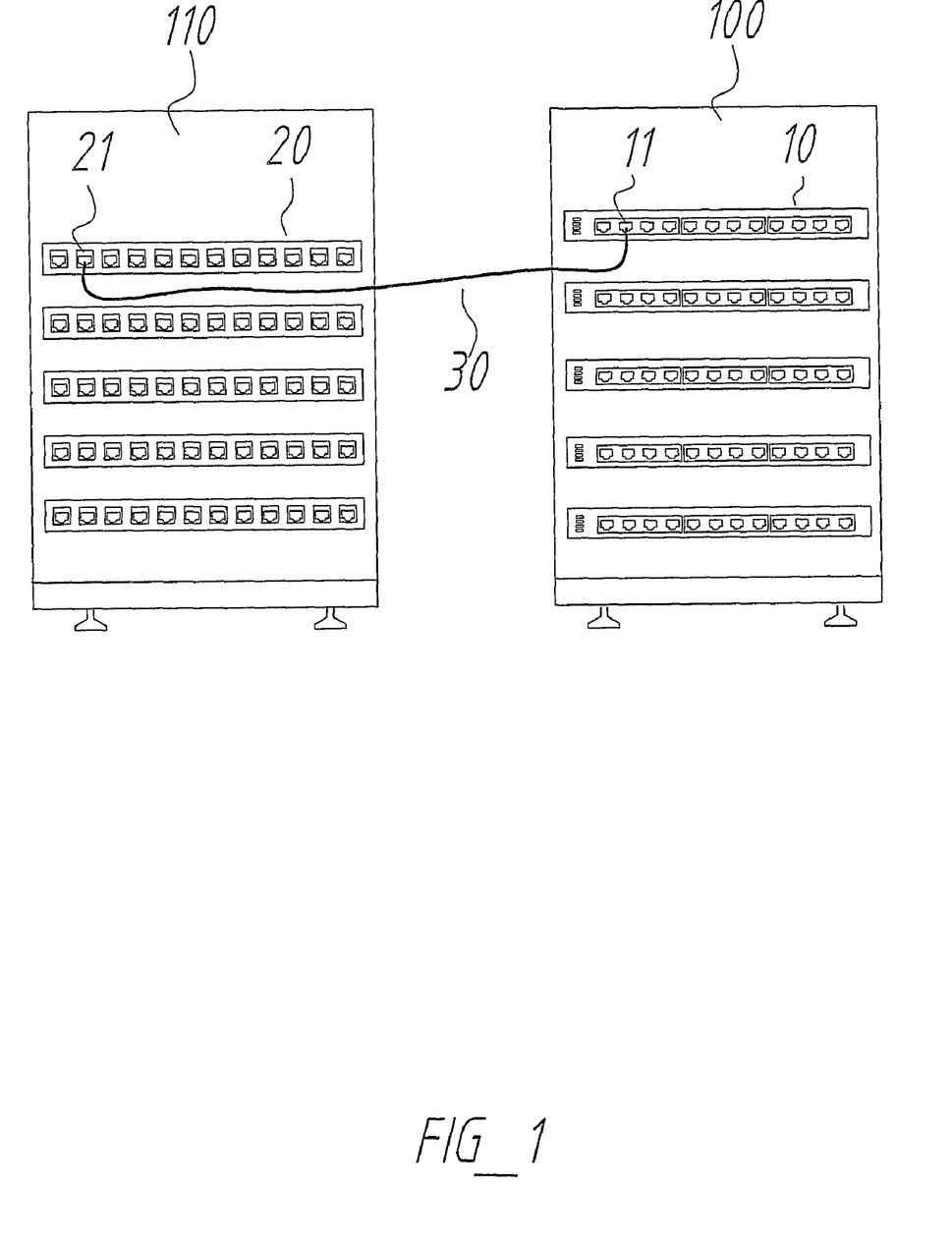
FIG. 1 is a schematic view of portion of a local access network (LAN) including an interconnection between an exemplary switch and an exemplary patch panel according to embodiments of the present invention.

Reference is made to FIG. 1 which is a schematic view of a portion of a local access network (LAN) including an interconnection between an exemplary switch and an exemplary patch panel according to embodiments of the present invention. FIG. 1 illustrates a first exemplary communication rack 100 for carrying a plurality of switches arranged in a vertical structure and a second exemplary communication rack 110 for carrying a plurality of interconnect devices or patch panels arranged in a vertical structure.

The switches may be, for example, local area network (LAN) switches such as Ethernet switches. A switch, such as switch 10 may include a plurality of communication ports, such as for example, port 11. According to embodiments of the invention, the ports of the switch may include add-on removable switch ID devices, as detailed herein with respect to FIGS. 3-5 to enable the monitoring of the interconnectivity between ports of the switch and ports of a patch panel. According to embodiments of the invention, by inserting the switch ID devices into standard sockets, such as for example RJ45 sockets, the switch ports may retain all their conventional functions and gain an identification function. For example, the modified RJ45 socket may include eight metal contacts used to provide Ethernet communication over four copper twisted pair wires according to the IEEE 802.3 and TIA/EIA 568B standards and a switch-ID device physically customized to fit into a standard RJ45 socket.

In the exemplary illustration, switch 10 includes twelve such modified communication sockets each including a switch-ID device located therein. The communication sockets may be RJ45 sockets, however, it will be appreciated to those skilled in the art the switch may include any other number and type of ports.

The patch panels may include a plurality of communication ports. For example, patch panel 20 may include twenty four communication ports, such as port 21 (only 12 of which are shown). Ports 21 may include for example modified RJ45 socket, each having additional contacts to enable the monitoring of the connectivity between ports of the switch and ports of a patch panel. Alternatively, the ports of patch panel 20 may be standard communication ports, such as standard RJ45 sockets and monitoring the connectivity may be enabled by an add-on panel, as detailed herein with respect to FIGS. 2 and 8.

A port on patch panel 20 may represent a communication outlet or an access point that may provide for example Ethernet LAN communication to an end-device, such as personal computer. In order to connect a selected outlet represented by port 21 of patch panel 20 to a selected switch port 11, a physical connectivity may be made between the switch port and the patch panel port by using a patch cord 30 having additional two dedicated wires for transmission of identification signals, as detailed herein with respect to FIGS. 6, 10 and 11. For example, patch cord 30 may include eight conductors (copper wires) that may be connected to the standard contact of an RJ45 connector and further two wires that may be connected to the contacts of an identification device. Patch cord 30 may be used to interconnect port 21 of patch panel 20 to port 11 of switch 10 in the interconnect topology.

According to other embodiments of the invention, patching is made between two patch panels having modified ports with an add-on identification device in a cross-connect topology. In the cross-connect configuration, a second patch panel may represent the switch ports, and each switch port may be permanently connected by a cable to a termination block at the rear side of the patch panel.

Although embodiments of the present invention are not limited in this respect, patch panel 20 may provide the basic characteristics of a structured cabling system according to international standards for structured cabling systems such as standards of the American National Standards Institute (ANSI), Telecommunications Industry Association (TIA), Electronic Industries Alliance (EIA) and International Organization for Standardization (ISO)/International Electrotechnical Commission (IEC). For example, (ANSI)/(TIA)/(EIA)-568-B and (ISO/IEC) 11801. The patch panel may include any type of connectors such as RJ45 at any performance levels such as, for example category 5, 5e, 6 and higher, defined in these standards, fiber optics connectors, BNC connectors and others.

Figure 2:
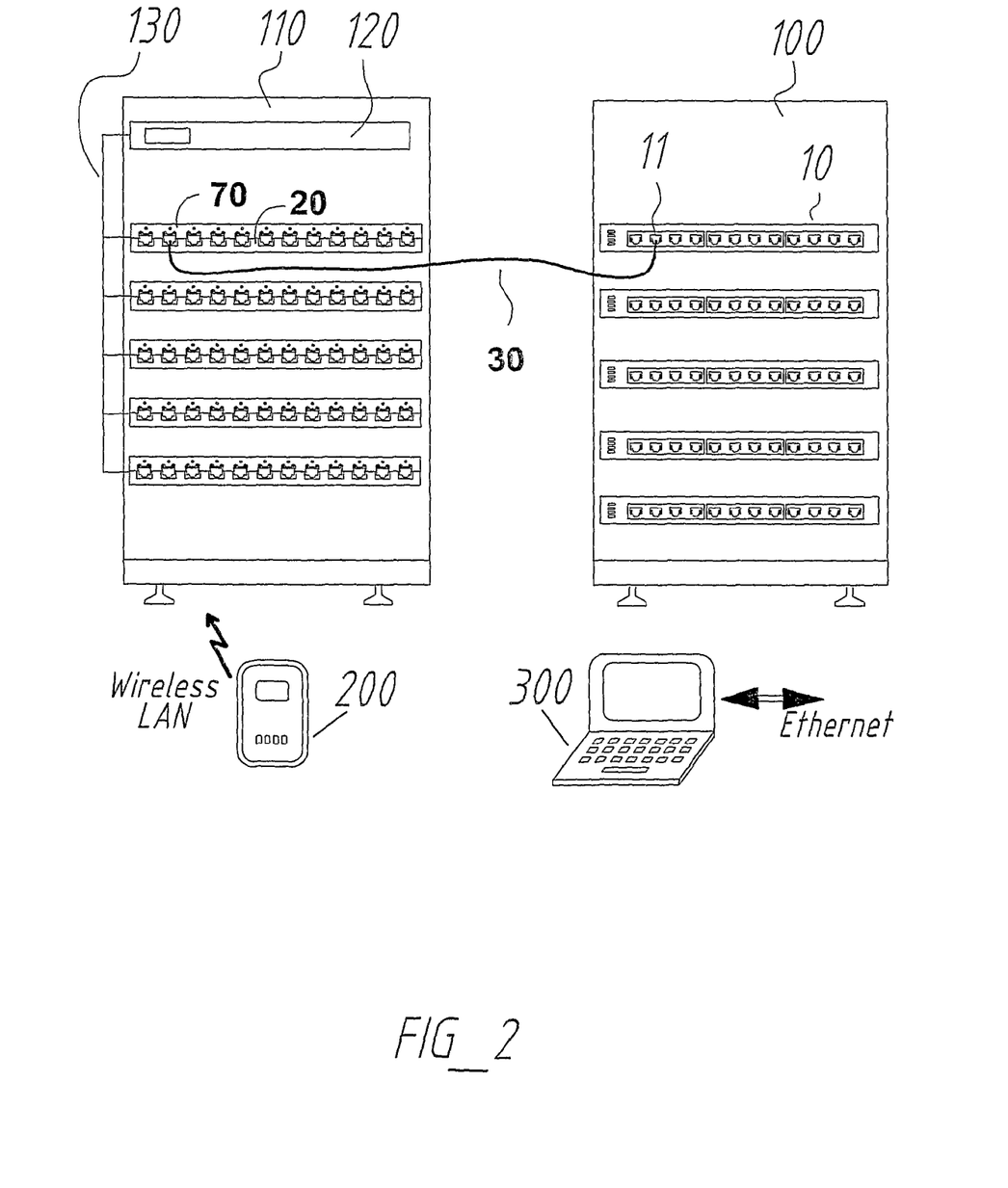
FIG. 2 is a schematic high level view of an exemplary connectivity monitoring system according to embodiments of the present invention.

Reference is made to FIG. 2 which is a schematic high level view of an exemplary connectivity monitoring system according to embodiments of the present invention. The physical interconnectivity between switches at rack 100 and patch panels of rack 110 may be monitored and mapped by a monitoring system as presented by embodiments of the present invention. The monitoring system may comprise various components such as switch identification (ID) devices, each located inside or within a respective switch port and front panels 70, each includes a reader or a microcontroller and each is mounted on or connected to a respective patch panel, e.g., patch panel 20. The monitoring system may further comprise a rack monitoring device 120 coupled to the patch panels via a communication bus 130, patch cords having plugs at each end, for example, patch cord 35, a management station 300 and computing device 200, which may be for example, a hand-held device.

Exemplary ID devices are described in detail with reference to FIGS. 3-5 according to embodiments of the invention. Exemplary add-on front panels are described in detail with reference to FIGS. 8-9 according to embodiments of the invention. Exemplary cable cords and plugs are described in detail with reference to FIGS. 6, 10 and 11 according to embodiments of the invention. An exemplary rack monitoring device is described in detail with reference to FIG. 12 according to embodiments of the invention.

As discuss herein, in order to monitor the connectivity between the switch ports and the patch panel ports, an identification device (ID device) may be inserted to each switch port. Patch cord 35 may include two additional wires and two plugs, one at each end, with dedicated conductive contacts to enable reading a unique ID from the ID device. According to embodiments of the invention, the plug inserted to the switch ports may include a modified latch, which may enable it to be received by a socket or a switch port with an ID device inside it. Panel 70 may further include conductive contacts, LED's and a microcontroller as described with respect to FIG. 8. The microcontroller may initiate the reading process of the unique ID and may monitor the status of all connections of the respective parch panel.

According to embodiments of the invention, central management station 300 may receive updates from each of the microcontrollers of the patch panels regarding connectivity status and changes in the connectivity patterns of ports. These status changes may be logged and may enable monitoring and mapping online the connectivity of the network. A standard Ethernet network may be used for communicating with management station 300.

Monitoring rack device 120 may be used as a communication concentrator for all underlying panels at rack 110. Monitoring rack device 120 may provide power supply and communication to all underlying panels. Communication bus 130 may be implemented by using a standard bus such as CAN bus, or any other type of a communication bus.

Computing device, such as hand-held device 200 may be for example, a PDA, Pocket PC and the like. It may be used as a main user interface for maintenance personnel and may enable mobile communication with other components of the network. Computing device 200 may communicate with management station 300 through wireless connection such as standard wireless LAN or by a wired connection to the LAN network through Monitoring rack device 120. According to embodiments of the invention, additional devices, such as rack visual indicators or security controllers may be connected to communication bus 130. A rack visual indicator may assist the operator in locating a desired rack or indicate regarding faults and error conditions.

Figure 3A:
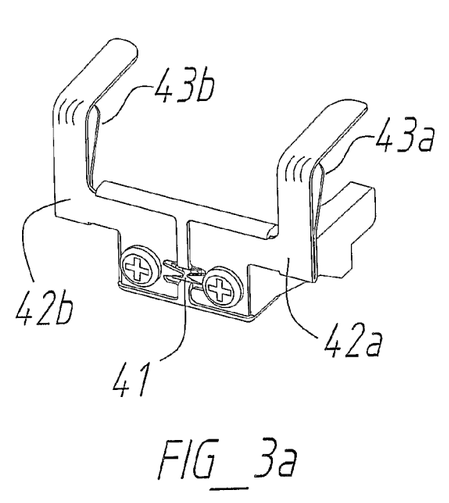
FIGS. 3A-3C are isometric views of an identification device according to embodiments of the present invention.
Figure 3B:
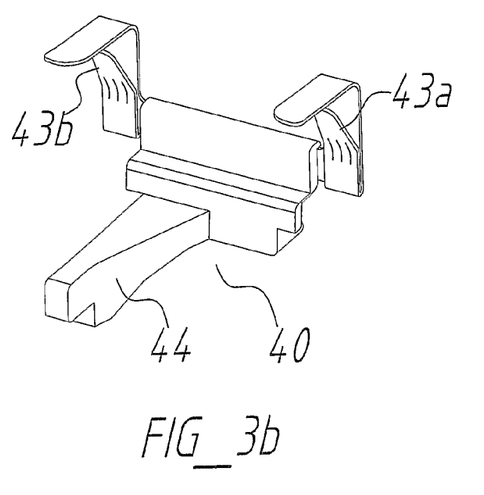
Figure 3C:
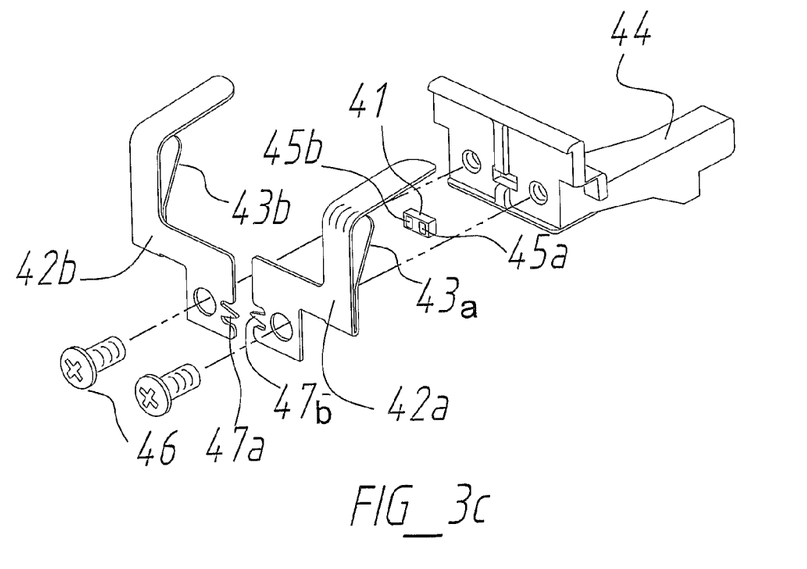

Reference is now made to FIGS. 3A-3C showing isometric views of an identification device according to embodiments of the present invention. FIG. 3A shows a front isometric view of an identification device 40, FIG. 3B shows a rear isometric view of identification device 40 and FIG. 3C is an exploded isometric view of identification device 40. In this exemplary embodiment, the identification device is designed to be inserted into an RJ-45 socket, however, it will be appreciated by those skilled in the art that other ID devices designed to fit any other socket are likewise applicable and are within the scope of the invention.

Identification (ID) device 40 may comprise an ID-chip 41, which may include an electrical component, for example, a semiconductor component such as Dallas Semiconductor 1-wire chip. ID-chip 41 may further include a memory unit to store a unique identification number. The unique identification number may be transmitted from ID-chip 41 to an external reader such as a microcontroller or a processor as described in detail herein. The unique identification number may be transmitted, for example, through one or more dedicated conductive pads, e.g., conductive pads 45*a* and 45*b* as a response to a signal transmitted by an external reader and received through the pads. According to embodiments of the invention, ID-chip 41 may not require any dedicated power supply source.

ID device 40 may include two conductive bodies 42*a* and 42*b* which may have both a mechanical and electrical role. Conductive body 42*a* may include a tooth-like portion 47*a* to create an electrical contact with pad 45*a*. Similarly, conductive body 42*b* may include a tooth-like portion 47*b* to create an electrical contact with pad 45*b*. Electrical current may flow through conductive bodies 42*a* and 42*b* to two respective springs 43*a* and 43*b*, which may be adapted to receive two opposite contacts of a plug inserted into the port in which ID device 40 was previously inserted. Conductive bodies 42*a* and 42*b* may be mounted or attached to an electrically insulating latch part 44, which may be a plastic part, for example, by one or more screws 46. Part 44 may be used as a latch to fix ID device 40 inside the RJ-45 socket.

It should be understood to a person skilled in the art that the mechanical design shown in FIG. 3 is only an example of a physical design; however, any other design, structure and physical shape of an ID device may be used as long as the original functionality of the port is maintained.

Figure 4A:
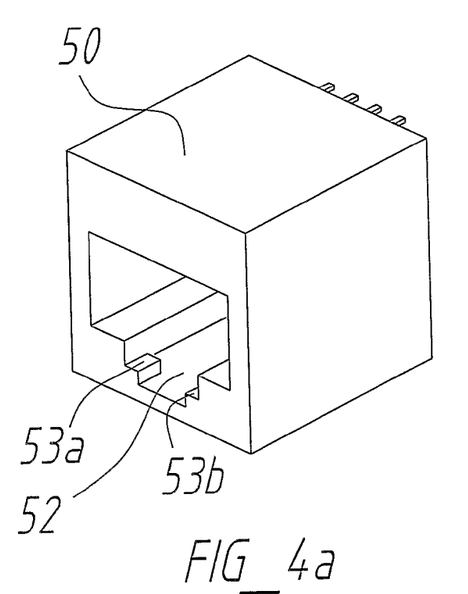
FIGS. 4A and 4B are an isometric view and a front view of an RJ45 socket.
Figure 4B:
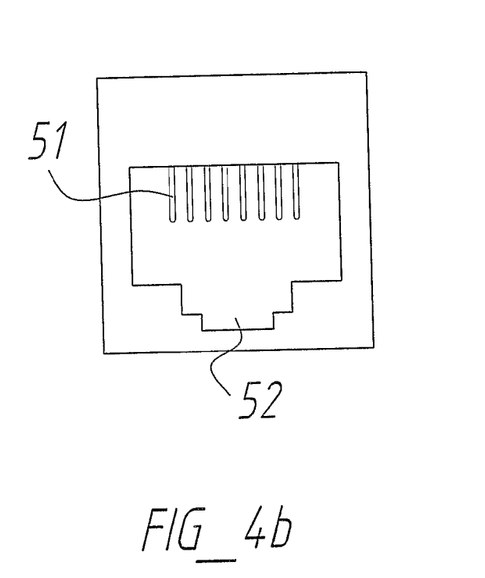

Reference is now made to FIGS. 4A and 4B which are an isometric view and a front view of a RJ45 socket helpful in understanding to embodiments of the present invention. The RJ45 standard socket is described as an example to a communication socket capable of being inserted with an ID device, such as ID device 40, however, it should be understood to a person skilled in the art that embodiments of the present invention are not limited in this respect and that ID device 40 may be shaped to fit to any other standard socket.

An RJ45 socket 50 may include a cavity, designed to receive an RJ45 plug. The mechanical shape and dimensions of such an RJ45 plug are well known and defined by the IEC 60603-7 standard. Socket 50 may include eight Ethernet contacts 51 according to the IEC 60603-7 standard that are shaped to create an electrical contact with eight metal contacts of a plug whenever the plug is inserted into the socket. Area 52 of the socket cavity is designed to receive the latch of the plug latch, which is able to snap into the cavity of the socket and to lock the plug in its place. The locking may be enabled by two protrusions 53*a* and 53*b*, which may be in the form of steps. Each of these protrusions may be located at an opposite side of area 52. The latch, which is an elastic electrically insulating part of the plug, may be raised up while the plug is inserted, and when reaching the rear end of the step it may return to its loose condition thus locking the plug behind the step. In order to release the plug the latch may be lifted and slide above the step so it can be pulled out of the socket.

According to embodiments of the invention, an ID device may fit into a communication socket, e.g., RJ45 socket in order to provide a unique ID to that socket. It should be understood that according to embodiments of the invention, an ID device may be designed to fit into any standard switch having a plurality of standard ports or sockets. Furthermore, while the ID device may be located inside the socket, the standard socket may be able to receive a modified plug which may maintain its original functionality. According to embodiments of the invention, the modified plug may be freely inserted into a modified standard socket having an ID device previously inserted therein.

Figures 5A, 5B:
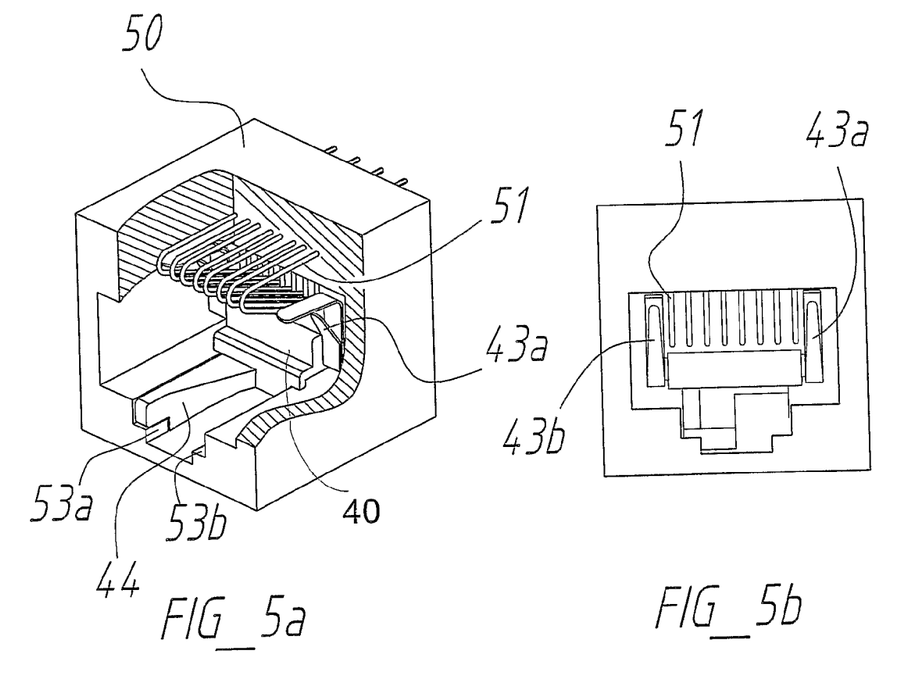
FIGS. 5A and 5B are an isometric section view and a front view of an RJ45 socket with an identification device according to embodiments of the present invention.
Figure 7:
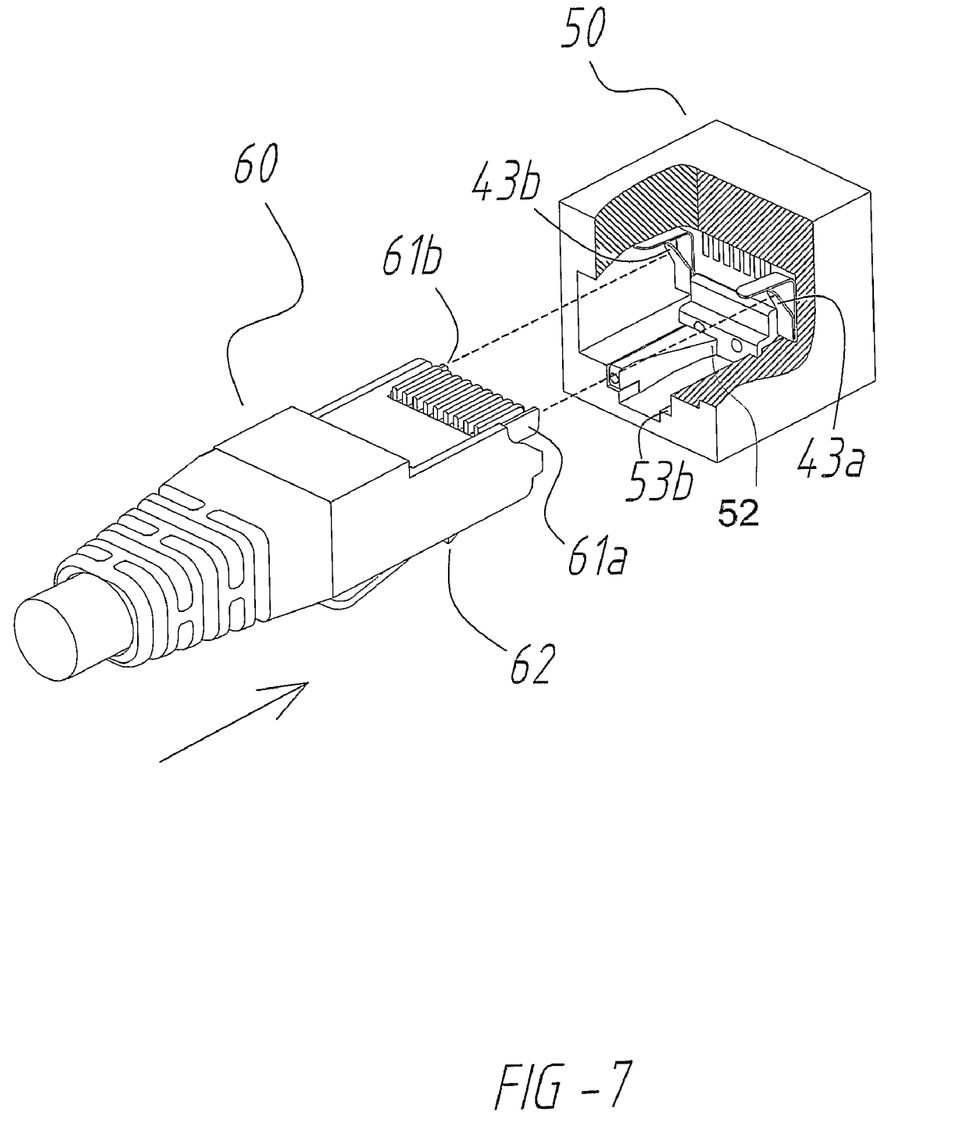
FIG. 7 is an isometric section view illustrating the insertion of a modified RJ45 plug into a RJ45 socket with an identification device according to embodiments of the present invention.

Reference is now made to FIGS. 5A and 5B which are an isometric section view and a front view of a RJ45 socket with an identification device according to embodiments of the present invention. According to embodiments of the invention when an ID device, e.g., ID device 40 of FIG. 3 is inserted into socket 50, the ID device would not interfere with the eight standard Ethernet contacts 51. When ID device 40 is inserted within socket 50, its spring contacts 43*a* and 43*b* may be positioned adjacent to contacts 51 at opposite sides of the row of contacts 51, Contacts 43*a* and 43*b* may enable the reading of the unique ID stored on ID device 40 by a modified plug 60 when inserted into the socket. As shown by FIG. 7, an electrical contact is created between contacts 43*a* and 43*b* and respective contacts 61*a* and 61*b* of the modified plug. ID device 40 may be designed to occupy a minimal space inside socket 50. Upon insertion of ID device 40 into socket 50, the rear side of ID device 40 that includes conductive bodies 42*a* and 42*b* and ID chip 41 may be confined only in an otherwise unoccupied space of the rear side of the socket. Latch part 44 may occupy a space below contacts 51. Accordingly, the physical dimensions of modified plug 60 may be reduced and may be designed to fit the shape of the cavity created by the modified socket. For example, part 44 may occupy approximately half the width of area 52. The remaining unoccupied area may receive a modified latch of a modified plug.

As shown by FIG. 5*a*, asymmetric part 44 may occupy, for example, the left part of area 52 and may function as a latch for ID device 40 by snapping into space 52 of socket 50 using protrusion or step 53*a*. When ID device 40 is inserted into socket 50, part 44 may be raised up using the springiness of conductive bodies 42*a* and 42*b* and when reaching the rear end of steps 53*a* and 53*b* conductive bodies 42*a* and 42*b* may return to their loose condition and part 44 may lock ID device 40 behind protrusions 53*a* and 53*b*. In order to release ID device 40, the end of part 44 may be lifted to allow ID device 40 to slide above step 53*a* and 53*b* and to be pulled out. It should be noted that for the purpose of such an operation a dedicated tool may be used.

Figure 6A:
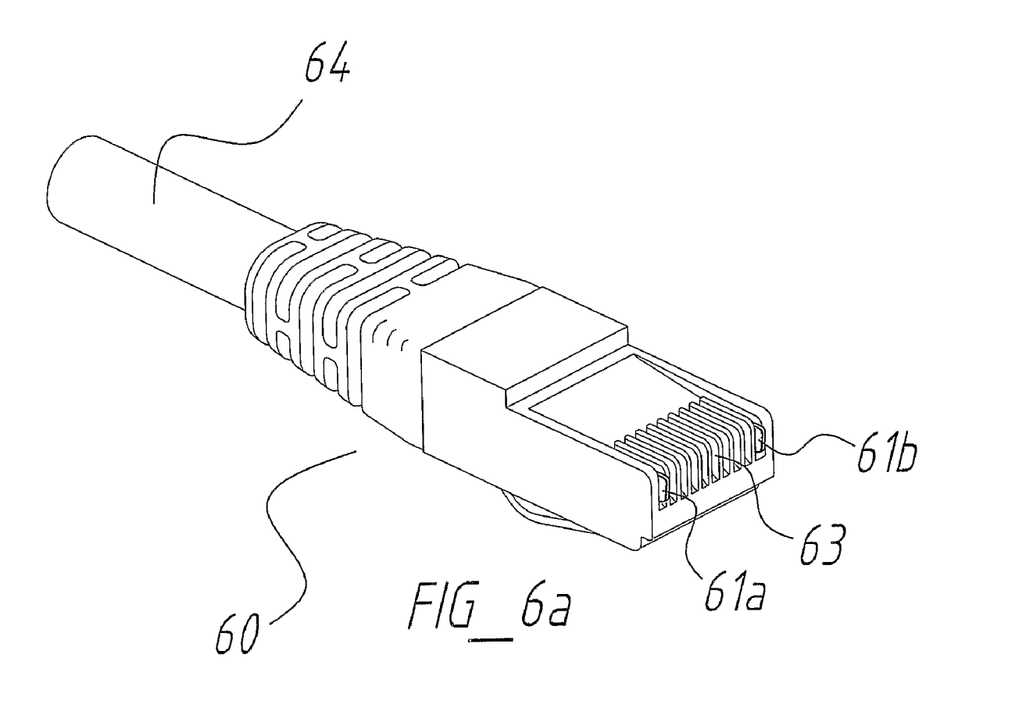
FIGS. 6A and 6B are isometric views of an RJ45 plug modified according to embodiments of the present invention.
Figure 6B:
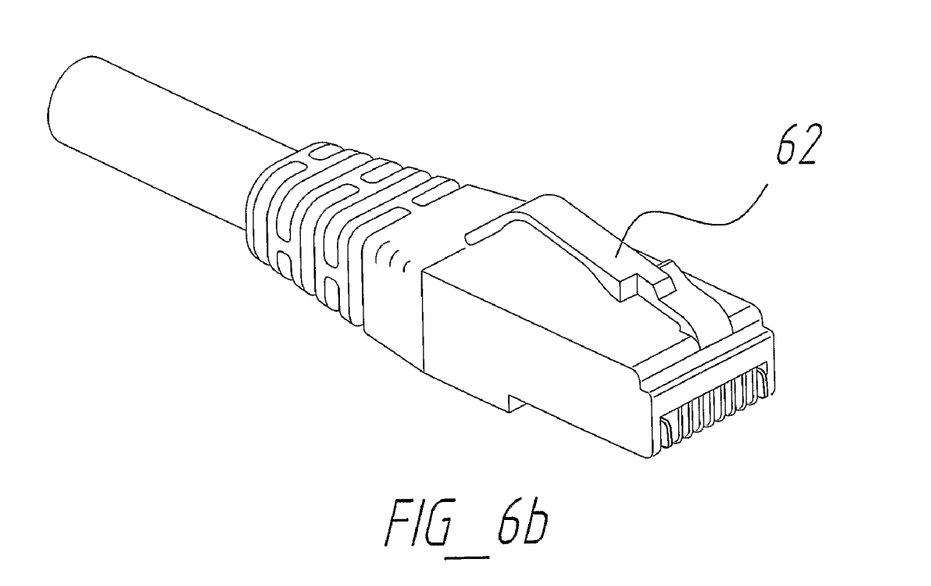

Reference is now made to FIGS. 6A-6B that show isometric views of a modified RJ45 plug according to embodiments of the present invention. Reference is additionally made to FIG. 7 which is an isometric section view illustrating the insertion of a modified RJ45 plug into an RJ45 socket having an identification device inserted therein in accordance with embodiments of the present invention. In this exemplary embodiment, the modified plug is a modified RJ45 plug, however, it will be appreciated by those skilled in the art that other ID devices designed to fit any other socket are likewise applicable and are within the scope of the invention.

A modified RJ45 plug, such as an exemplary plug 60 may be assembled at a first end of a patch cord such as a patch cord 64 and may be designed to fit an RJ45 socket, in which an ID device, such as ID device 40 is inserted. Plug 60 may have a similar functionality as a standard RJ45 plug. Plug 60 may comprise eight standard contacts to enable transmission of Ethernet communication and two additional conductive contacts 61a and 61b. Plug 60 may further comprise a modified latch 62 to fit a free space of socket area 52 that in not occupied by latch 44 of ID device 40.

As shown by FIG. 7, when plug 60 is inserted into socket 50 in which ID device 40 was previously inserted, contacts 61a and 61b of plug 60 may create an electrical contact with spring contacts 43a and 43b respectively. Latch 62 of modified plug 60 may be an elastic electrically insulating part which may be the mechanical complementary of part 44 of ID device 40. Latch 62 may occupy the width of area 52, which is not occupied by part 44 of ID device 40. When plug 60 is inserted into the socket, latch 62 may snap into the cavity of socket 50 using protrusion or step 53b. Latch 62 may be first raised up and when reaching the end of step 53b may return to its loose condition and may lock the device behind step 53b. In order to release plug 60 the end of latch 62 may be lifted and plug 60 may slide above step 63b and may be pulled out. These insertion and removal procedures are similar to insertion and removal procedures of a standard RJ45 plug, with the exception that latch 62 may use only one of two protrusions 53a and 53b.

According to embodiments of the invention, in order to read the unique ID of ID-chip 41, dedicated wires, for example two dedicated wires, may be added to the standard wires inside cable 64. For example, cable 64 may include ten wires, eight of which may be standard wires to enable Ethernet communication and two wires may be dedicated for delivering signals carrying the unique ID of an ID device from a switch port to a connected port of the patch panel. The detecting or reading of the unique ID of a switch port by the patch panel may be enabled by inserting a first plug of cable 64 in switch port and a second plug of cable 64 in a patch panel port thus closing an electrical circuit that includes spring contacts 43a and 43b of ID device 40, conductive contacts 61a and 61b of plug 60, the two dedicated wires of cable 64 and a microcontroller, such as microprocessor 75 of FIG. 9 on the patch panel side.

Figures 8A, 8B:
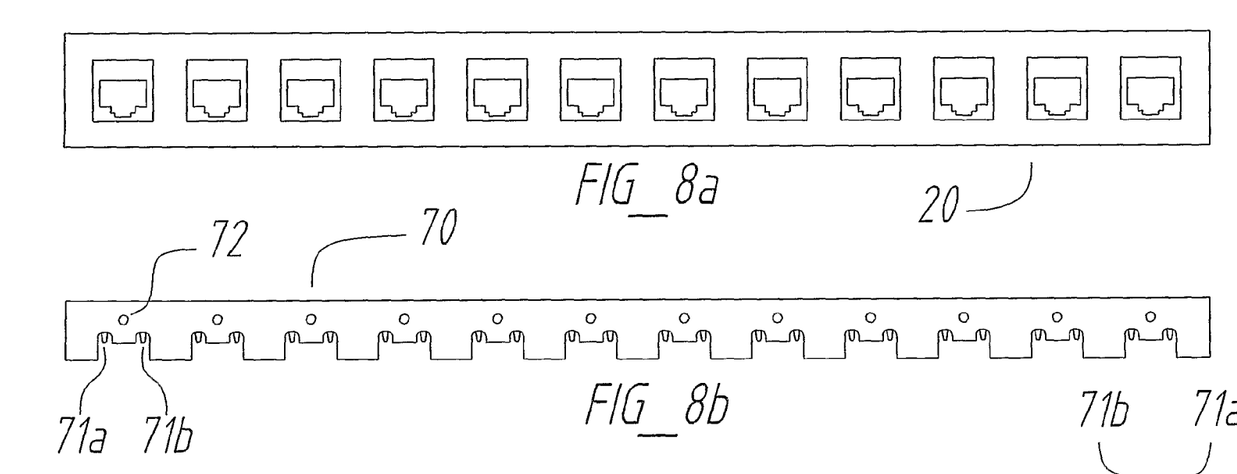
FIG. 8A is a front view of an exemplary patch panel according to embodiments of the present invention.
FIGS. 8B and 8C are front and rear views of an add-on front panel according to embodiments of the present invention.
Figure 8C:
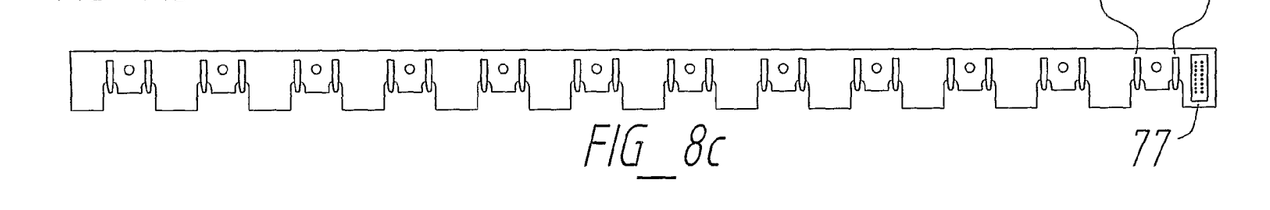
Figure 8D:
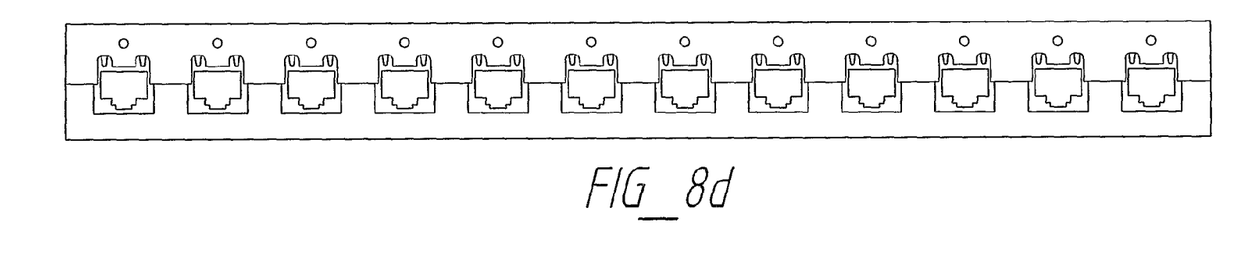
FIG. 8D is a front view of an exemplary patch panel with an add-on front panel according to embodiments of the present invention.

Reference is made now to FIG. 8A-8D. FIG. 8A is a front view of an exemplary patch panel according to embodiments of the present invention, FIGS. 8B and 8C are front and rear views of an exemplary add-on front panel according to embodiments of the present invention and FIG. 8D is a front view of the exemplary patch panel with the exemplary add-on front panel according to embodiments of the present invention.

As shown by FIG. 1, communication rack 110 may include a plurality of patch panels, such as patch panel 20. Patch panel 20 may be of any type, for example, unshielded type or shielded type, and the RJ connectors may be of any type, for example, keystone type or PCB mounted type and support any category of cabling standard. Panel 20 may have an add-on panel, such as, panel 70. Panel 70 may include a printed circuit board covered by a front side and a plurality of pairs of conductive contacts, for example, contacts 71a and 71b. As detailed herein, each pair may correspond to a respective port of patch panel 20. For example, panel 70 may comprise twenty four pairs of conductive contacts, (only twelve of which are shown). Panel 70 may further include light emitting diodes (LED's), such as LED 72. Each LED may correspond to a respective port of patch panel 20. Panel 70 may further comprise a connector 77 at the rear side as shown by FIG. 8C. Although embodiments of the invention are not limited in this respect, the number of LED's may be identical to the number of pair of conductive contacts.

Panel 70 may be assembled over, attached or mounted to patch panel 20 as shown by FIG. 8D such that two adjacent contacts and a corresponding LED may be added to each port of patch panel 20. The two conductive contacts, for example, 71a and 71b, may be spring contacts protruding towards the opening of the port. It should be understood to a person skilled in the art that patch panel 20 and add-on panel 70 may include any number of ports and any type of ports.

Figure 9:
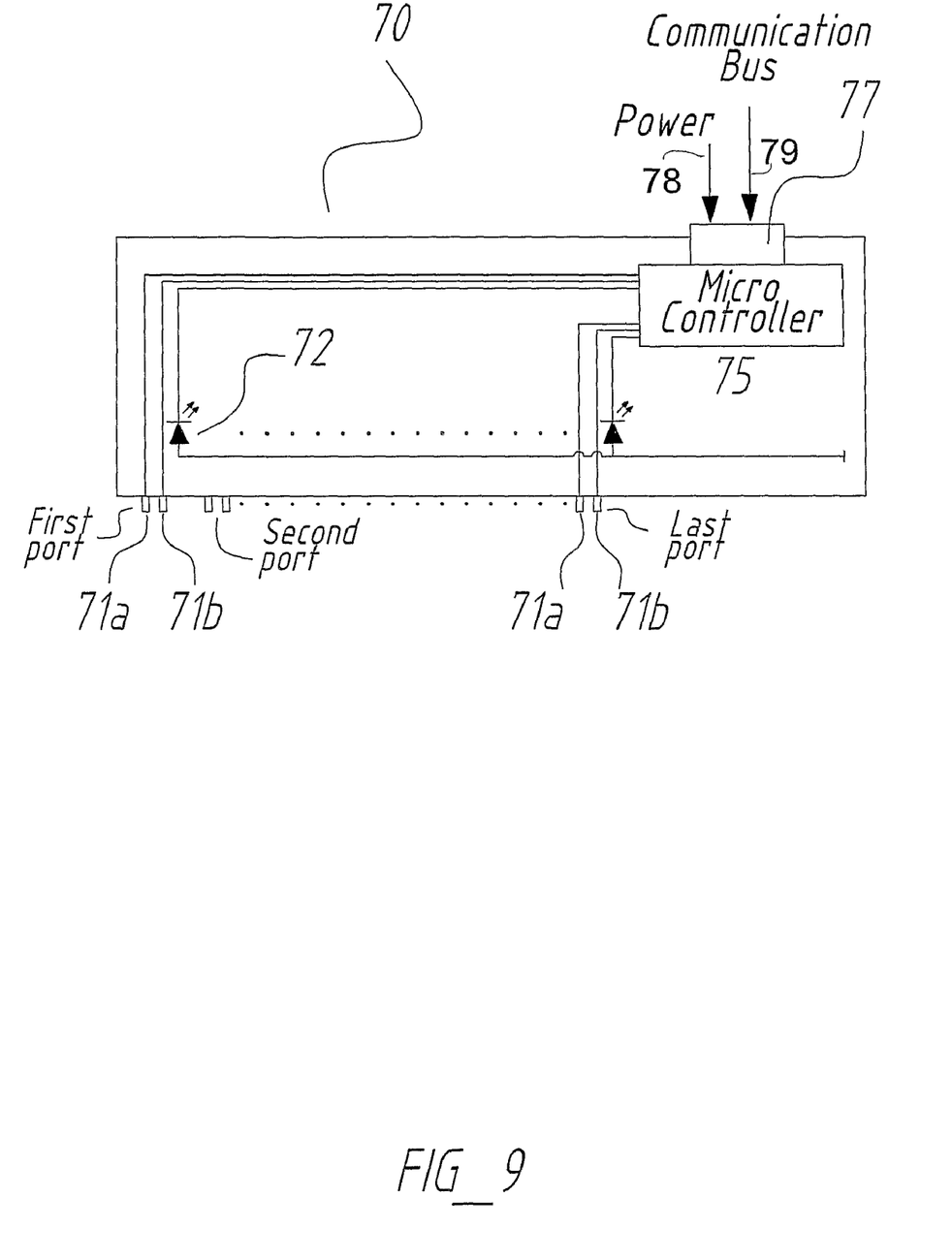
FIG. 9 is a schematic diagram of an add-on front panel according to embodiments of the present invention.

Reference is made now to FIG. 9 which is a schematic diagram of an exemplary add-on front panel according to embodiments of the present invention. FIG. 9 is a schematic diagram illustrating the electrical components of an exemplary front panel, for example panel 70 of FIG. 8B. Front panel 70 may include a microcontroller 75 which may store updated connectivity status of all ports of the patch panel to which panel 70 is attached. Microcontroller 75 may comprise input/output ports (I/O ports), each coupled to a respective pairs of contacts 71a, 71b and to a respective LED 72. Microcontroller 75 may comprise a power input 78 for providing the power required for operation of microcontroller 75, and a communication bus 79 for interfacing microcontroller 75 with external devices. Microcontroller 75 may include a connector 77 which may be a mechanical interface for both power input 78 and communication bus 79. Connector 77 may be located, for example, on the rear side of panel 70.

Microcontroller 75 may send signals, sequentially or periodically, via each I/O port to contacts 71a, 71b. Then the signals may be transferred via dedicated wires within cable 64 to identification device 40 located within the connected switch port. When the signal is received by ID chip 41 of ID device 40, it may respond by transmitting the unique identification number of the connected switch port. This number is then received by microcontroller 75 and may be stored in its memory. Whenever a new patch cord is connected between a switch port and a patch panel port, the microcontroller may identify a new unique ID at the port and may update the relevant record in its memory. Likewise, when a patch cord is removed, the unique ID may be no longer detected and the port status in the memory of the microcontroller is updated in a similar manner.

Microcontroller 75 may turn on or turn off LED's 72 for the purpose of guiding the operating personnel. For example, microcontroller 75 may turn on a LED associated with a patch panel port that had disconnected from its respective switch port as guidance for the operating personnel.

Figure 10:
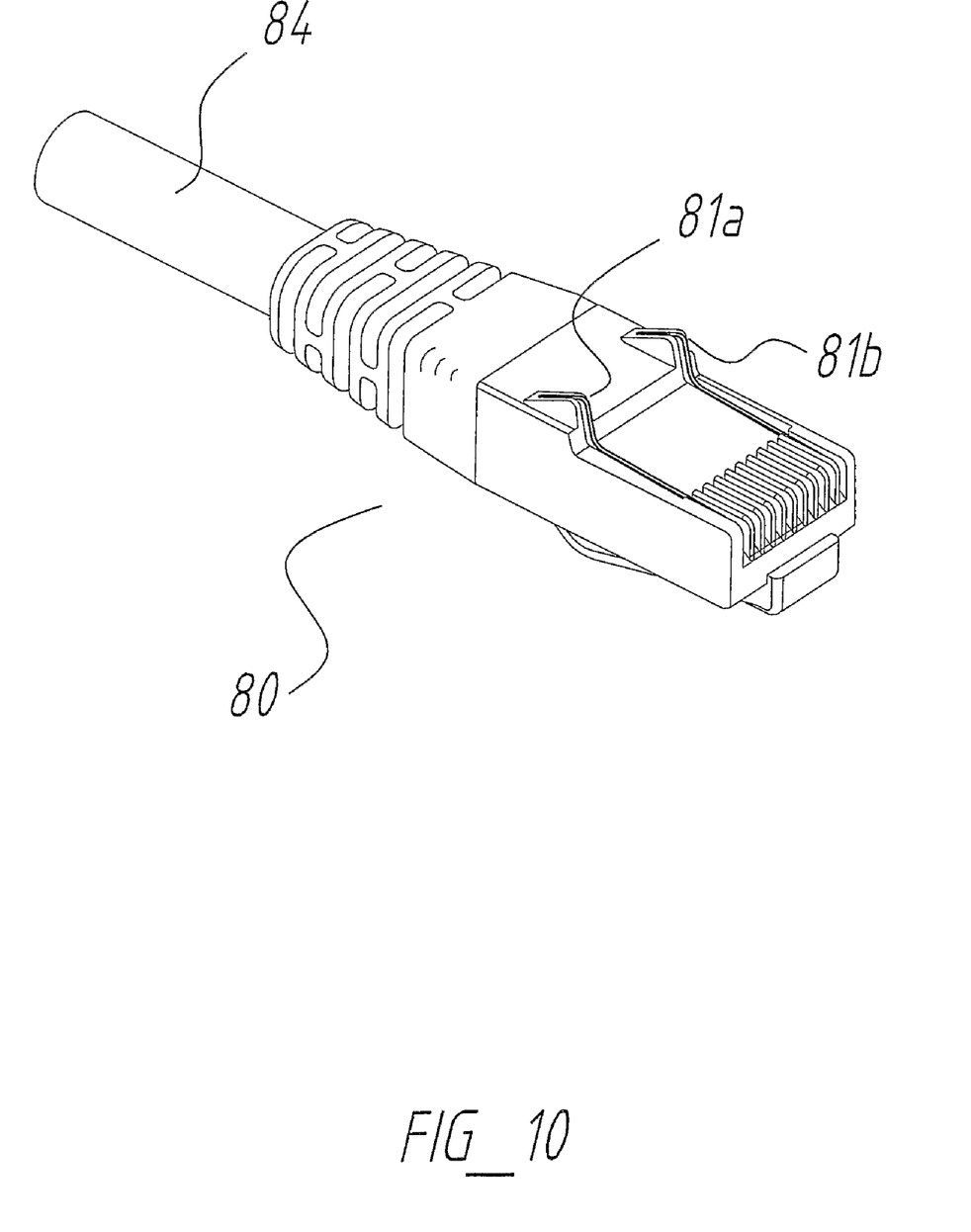
FIG. 10 is an isometric view of an RJ45 plug with additional contacts according to embodiments of the present invention.

Reference is made now to FIG. 10 which is an isometric view of a modified RJ45 plug with additional contacts according to embodiments of the present invention. A modified plug, such as plug 80 may be designed to be connected to an exemplary patch panel with an add-on front panel such as panel 70. For example, an exemplary patch cord 84 may comprise plug 80 designed to be connected to patch panel port 20 at one en and plug 60 designed to be connected to switch port 21 at the other end. Plug 80 may comprise two conductive contacts 81a and 81b. When plug 80 is inserted patch panel port 20, conductive contacts 81a and 81b may create an electrical contact with conductive contacts 71a and 71b of the panel, respectively.

According to embodiments of the invention, microcontroller 75 may read the unique ID of ID device 40 located inside a switch port 11 through a path which may include spring contacts 43a and 43b of ID device 40, the conductive contacts 61a and 61b of modified plug 60 located at one end of patch cord 64, two dedicated wires of the cable 64, two conducive contacts 81a and 81b of plug 80 located at the second end of patch cord 64 and two conductive contacts 71a and 71b of panel 70.

Figure 11A:
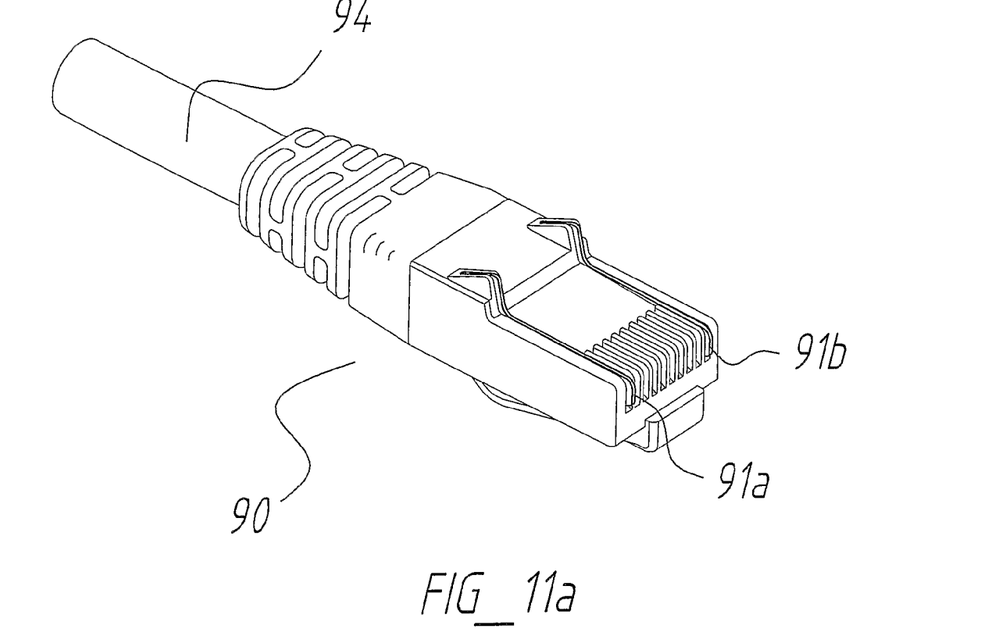
FIGS. 11A and 11B are isometric views of a modified RJ45 plug with additional contacts according to embodiments of the present invention.
Figure 11B:
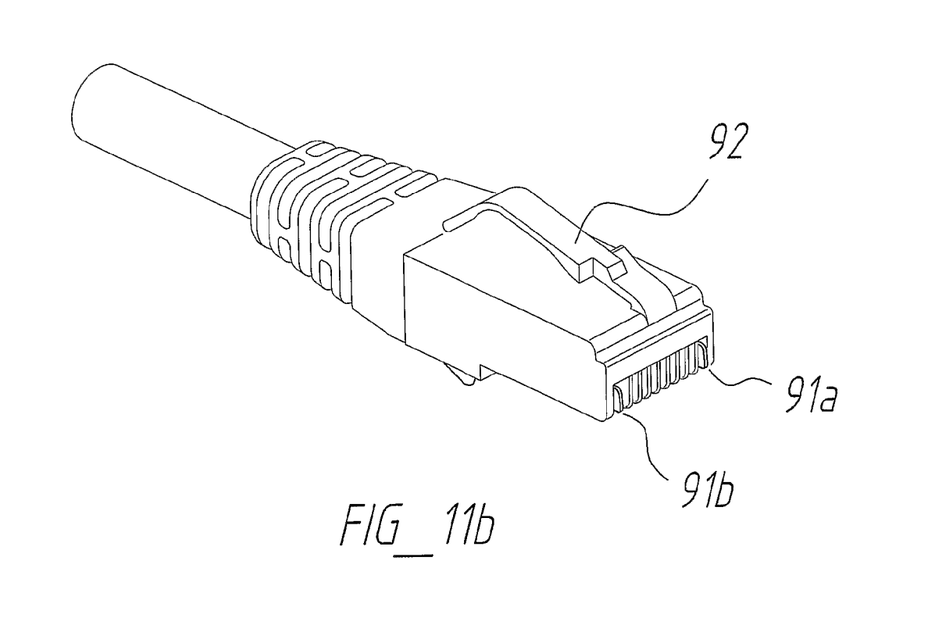

Reference is made now to FIGS. 11A and 11B which are isometric views of a modified RJ45 plug with additional contacts according to embodiments of the present invention. According to other embodiment of the invention, plug 90 is another exemplary modified RJ45 plug, which may be used at both ends of a patch cord, namely, the same plug 90 may be used at both ends of a patch cord. For example, plug 90 may be assembled on both sides of patch cord 35. Plug 90 may include dual-purpose conductive contacts 91a and 91b. The front end of contacts 91a, 91b located adjacent to the 8 standard contacts may be used to create an electrical contact with the spring contacts of an ID device, while being connected to a switch port. The rear end of contacts 91a, 91b may be used to create an electrical contact with the two contacts of an add-on panel, while being connected to a patch panel socket. In addition latch 92 may be modified to fit, for example, a RJ45 socket with an ID device located inside.

According to another embodiment of the present invention, the reader or microcontroller may be integrated into a printed circuit board, on which the RJ45 sockets are mounted. In this case, the pair of conductive contacts may reside inside a ten-contact RJ45 socket instead of being external on an add-on panel. In addition, the opposite contacts of the plug may be located adjacent to the eight contacts at the front of the plug similar as shown by FIG. 6a.

Figure 12:
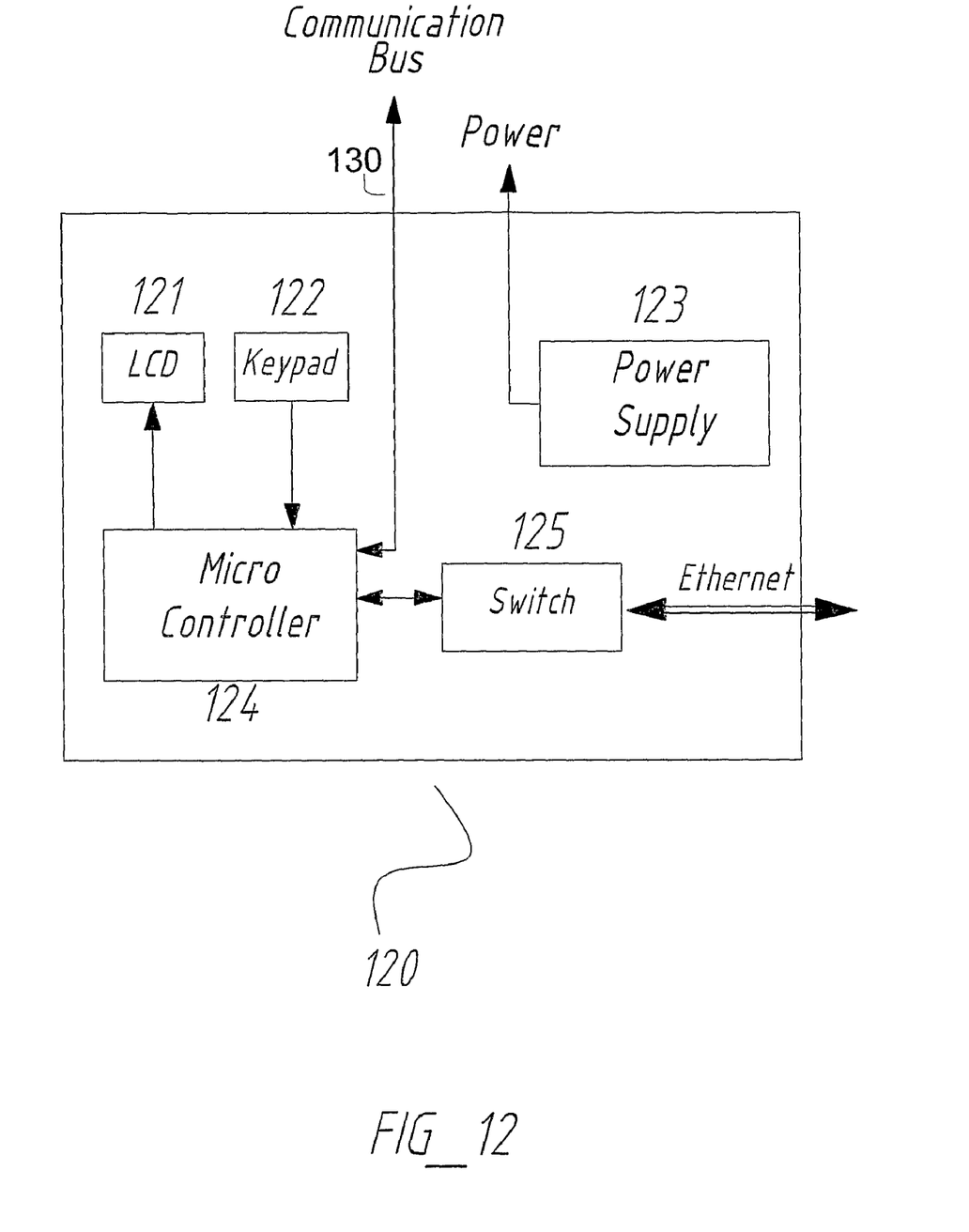
FIG. 12 is a schematic diagram of an exemplary rack device according to embodiments of the present invention.

Reference is made now to FIG. 12 which is a schematic diagram of an exemplary rack monitoring device according to embodiments of the present invention. According to embodiment of the invention, a communication rack device, for example, communication rack device 120 of FIG. 2 may include a microcontroller 124 to enable communicating with microcontrollers 75 of patch panels 20 through communication bus 130. As shown in FIG. 2, all the data received through bus 130 may be retransmitted to management station 300 via switch 125 over, for example, Ethernet communication. Rack monitoring device 120 may further include a power supply 123 to supply power feed to all add-on panels 70 of patch panels 20 and user interface devices, such as keypad 122 or LCD display 121 to enable system operation and maintenance.

Although the invention is not limited in this respect, the operation of the system described in embodiments of the invention may require an initial setup process. During a setup process, a database containing data related to identification of the switch ports by their corresponding unique identifications may be established. The initial setup process may be integrated with the process of insertion of the ID devices into the ports off the switches. Each ID device may be inserted into a switch port using a special tool which may be capable of reading the unique ID and sending it to a computing device that may be a hand-held device. According to some embodiments, an operator holding the hand-held device may be guided by the hand-held device software to select a relevant switch from the database and to acknowledge the port number of each port and its unique ID determined by the specific ID device inserted into that switch port. This process may enable a quick and reliable setup process, which may create a basic database of unique identifications and port identifications. When a switch is replaced or added and a new ID device may become operation, the setup process may be repeated for the specific switch to which the ID device was inserted.

According to some embodiment of the invention, the plug inserted into a switch socket may have a push button. Pressing the push button may connect together the two ID reading dedicated wires connected to the plug, creating a "short" condition. This short condition between the wires may be identified by the reader circuitry at the patch panel and may cause the LED of the relevant patch panel port to be turned on to notify an operator of the location of the far end of the patch cord connected to the switch port.

It should be understood to a person skilled in the art, that embodiments of the invention may be used for monitoring connections between various kinds of communication ports, e.g., communication ports of active or passive equipment. For example, a connection between ports of two patch panels may be monitored by inserting ID devices to one of the patch panels, while reading the unique ID at the second. In addition, the ID device may be used within ports of any type of active equipment. In the exemplary illustrations and the description of embodiments of the invention a modified RJ45 connector is illustrated, however, it should be understood that any other type of connector, for example, any type of copper or fiber connectors may be monitored by using a specific ID devices, which are mechanically designed to fit the specific connectors.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for monitoring connectivity between a switch having switch ports and a patch panel having patch panel ports connected by removable cords, the system comprising:
   an identification device located within a switch port and storing a unique identification number associated with the switch port, wherein the identification device is physically shaped to fit a cavity of the switch port;
   a communication cord to connect the switch port to a patch panel port, wherein the communication cord comprises identification wires to transmit the unique identification number to the patch panel;
   a microcontroller mounted on the patch panel to receive the unique identification number; and
   a management station to receive the unique identification number from the microcontroller and to store data regarding connectivity of the switch port and the patch panel port.

2. The system of claim 1, wherein the identification device comprises:
   a memory unit to store the identification number;
   conductive pads to transmit the identification number from the memory unit;
   conductive contacts to receive the identification number from the conductive pads;
   conductive springs to receive the identification numbers from the conductive contacts and to transfer the identification number to contacts of a plug of the communication cord inserted into the switch port; and
   a latch element to fix the identification device inside the cavity of the switch port.

3. The system of claim 1, wherein the communication cord comprises:
   a first plug at a first end of the communication cord to be inserted into the switch port, wherein the first plug comprises contacts to receive the identification number from the identification device;

a second plug at a second end of the communication cord to be inserted into the patch panel port, wherein the second plug comprises contacts to receive the identification number from the identification wires of the communication cord.

4. The system of claim 3, wherein the first plug comprises a latch element physically shaped to fix the first plug inside a switch port containing the identification device.

5. The system of claim 1, wherein the microcontroller is to send a signal to a plurality of ports of the switch, to receive an identification number from each identification device of each of the plurality of ports and to transfer the identification number of each of the plurality of ports to the management station.

6. The system of claim 1, wherein the microcontroller is located on an add-on panel mounted on the patch panel.

7. The system of claim 6, wherein the add-on panel comprises:
conductive contacts to transfer signals from the microcontroller to the ports of the patch panel;
a plurality of light emitting diodes (LED's) to guide an operating personal; and
a memory to store an identification number received upon each disconnection and connection of a plug.

8. The system of claim 1, further comprising a hand held device to communicate with the management station via a wireless connection.

9. The system of claim 1, further comprising:
a central microcontroller to communicate via a communication bus with a plurality of microcontrollers each connected to a different patch panel, wherein the central microcontroller is to receive data regarding identification numbers of each of the ports of each of the patch panels and to transfer the data to the management station.

10. A method for monitoring connectivity between a switch and a patch panel connected by removable cords, the method comprising:
inserting an identification device into a port of the switch, wherein the identification device is physically shaped to fit the port of the switch and stores a unique identification number associated with the switch port;
connecting the port of the switch to a port of the patch panel by a communication cord having a first plug at an end connected to the port of the switch, the first plug is physically shaped to fit a space within the port of the switch not occupied by the identification device, a second plug at an end connected to the port of the patch panel and identification wires to transmit the unique identification number to the patch panel;
transmitting a signal from a microcontroller mounted on the patch panel to the identification device via the identification wires;

receiving, by the microcontroller, the unique identification number via the identification wires of the communication cord;
storing the unique identification number of the port of the switch in a memory element of the microcontroller; and
transferring the unique identification number to a management station.

11. The method of claim 10, further comprising:
updating the unique identification number of the port of the switch in the memory element upon every disconnection and connection of the communication cord.

12. The method of claim 10, wherein inserting the identification device into the port of the switch comprises fixing the identification device in the cavity of the switch port by a latch element of the identification device.

13. The method of claim 10, wherein connecting the port of the switch to the port of the patch panel by a removable cord comprises fixing the first plug into the port of the switch by a latch element of the first plug and fixing the second plug into the port of the patch panel.

14. The method of claim 10, wherein transmitting a signal from the microcontroller and receiving the unique identification number from the identification device comprises closing an electrical circuit between the microcontroller and the identification device.

15. The method of claim 13, wherein closing the electrical circuit between the microcontroller and the identification device comprises:
connecting conductive pads of the identification device to conductive contacts of the identification device;
connecting the conductive contacts of the identification device to conductive springs of the identification device;
connecting the conductive springs of the identification device to conductive contacts of the first plug;
connecting the conductive contacts of the first plug to conductive contacts of the second plug by dedicated wires of the removable cord; and
connecting the conductive contacts of the second plug to conductive contact of the microcontroller.

16. The method of claim 10, further comprising:
receiving by a central microcontroller data regarding identification numbers of a plurality of ports of a plurality of switches connected to a plurality of ports of a plurality of patch panels from a plurality of microcontrollers each connected to a different patch panel of the plurality of the patch panels via communication bus.

17. The method of claim 16, further comprising:
transferring the data from the central microcontroller to the management station.

18. The method of claim 16, further comprising:
communicating by a hand held device to the management station to receive the data from the central microcontroller.

* * * * *